United States Patent [19]

Keller

[11] Patent Number: 5,315,922

[45] Date of Patent: May 31, 1994

[54] TABLE-TOP BAKING OVEN, PARTICULARLY FOR PIZZA, OR THE LIKE

[75] Inventor: Robert Keller, Zurzach, Switzerland

[73] Assignee: Robert Keller AG, Rekingen, Switzerland

[21] Appl. No.: 7,249

[22] Filed: Jan. 21, 1993

[30] Foreign Application Priority Data

Feb. 5, 1992 [CH] Switzerland .................. 00305/92
Feb. 5, 1992 [CH] Switzerland .................. 00306/92

[51] Int. Cl.⁵ .................. A21B 1/00; A21B 1/33; A21B 1/52; A21B 5/00
[52] U.S. Cl. .................. 99/447; 99/401; 99/422; 126/273 R; 126/273.5
[58] Field of Search .................. 99/341, 401, 422, 423, 99/425, 426, 447, 450, 467; 126/9 R, 9 B, 25 R, 41 R, 41 A, 39 H, 39 J, 4, 33, 39 A, 39 C, 217, 218, 214 R, 200, 273.5, 273 R, 274, 275 R; 219/400

[56] References Cited

U.S. PATENT DOCUMENTS

| | | | |
|---|---|---|---|
| 2,210,521 | 8/1940 | Bemis | 99/448 |
| 2,559,196 | 7/1951 | Medved | 99/422 |
| 2,662,263 | 12/1953 | Fuger | 126/273 R |
| 4,362,093 | 12/1982 | Griscom | 99/401 |
| 4,512,248 | 4/1985 | Yolakakis | 126/41 A |
| 4,512,249 | 4/1985 | Mentzel | 99/448 |
| 4,724,755 | 2/1988 | Escamilla | 99/448 |
| 4,776,319 | 10/1988 | Colangelo et al. | 126/39 C |
| 4,962,697 | 10/1990 | Farrar | 99/448 |
| 5,067,396 | 11/1991 | Sorensen et al. | 126/9 B |
| 5,184,599 | 2/1993 | Stuart | 99/401 |

FOREIGN PATENT DOCUMENTS 2844930 4/1980 Fed. Rep. of Germany .
1566246 3/1969 France .
2425826 12/1979 France .
2573957 6/1986 France .

Primary Examiner—Timothy F. Simone
Attorney, Agent, or Firm—Frishauf, Holtz, Goodman & Woodward

[57] ABSTRACT

To provide for both top and bottom heating of baked goods in a portable table-top baking oven, a bottom part (2, 2') is closed off by a removable cover (3, 3') which is essentially dome-shaped, and made of unglazed heat-resistant stoneware. The space beneath this cover defines a baking space. The cover is formed with introduction openings 4, 4', preferably three or four, uniformly positioned about the lower circumference and open at the bottom. The cover is seated on the bottom part which, in one embodiment, retains fuel-supplied heaters, for example three, positioned circumferentially around the outer circumference of the bottom part, heat being distributed through an apertured heat distribution plate 7 beneath a carrier plate (10) for the goods to be baked, and around the outside through a gap (16) between the carrier plate and the dome-shaped cover and into the baking space of the dome-shaped cover; in another embodiment (FIGS. 6, 7), one or two electrical heating elements (25, 33) are located, respectively, within the baking space beneath the dome-shaped cover and underneath the carrier plate. Baked goods placed on the carrier plate, for example by an introduction ladle (18) thus are heated uniformly from the top and the bottom, with heat being applied to the bottom of the baked goods through the carrier plate (10) which is made of highly heat conductive material, for example aluminum.

16 Claims, 6 Drawing Sheets

TABLE-TOP BAKING OVEN, PARTICULARLY FOR PIZZA, OR THE LIKE

FIELD OF THE INVENTION

The present invention relates to a home appliance, and more particularly to a table-top pizza oven, intended for non-commercial use, for baking of pizza, or other baked goods, in a home environment.

BACKGROUND

When making baked goods, for example pizza, or the like, it is desirable to have a well-balanced relationship between heat applied to the goods to be baked from the top, as well as from the bottom. This ensures uniform baking of the dough, and hence a uniformly baked final product. In home-use baking ovens, particularly in table-top units of this kind, a problem arises in that the baking heat distribution within the oven frequently is non-uniform, resulting in non-uniform heating of the dough. Thus, for example when baking pizza, either the upper side or the bottom side of the dough remains too moist, and not sufficiently crisp; or, if there is excessive heat on one side, the dough may burn.

THE INVENTION

It is an object to provide a baking oven, particularly for home use, or table-top use, in which the heat distribution within the oven is essentially uniform, so that heat from the top, as well as from the bottom, will be in balance, and which is further so constructed that moisture arising in the baking will not precipitate on the goods being baked. The apparatus is particularly suitable for home-baking of fresh pizzas, and especially for a plurality of pizzas, in one baking operation.

Briefly, the baking oven has a top part and a bottom part, in which the top part is formed by a removable cover which, in accordance with the feature of the invention, is an unglazed, heat-resistant stoneware element, for example burned clay or the like, formed with at least two, preferably three or four introduction openings for the dough, uniformly positioned along the lower circumference of the dome-shaped cover element. The dome-shaped cover element is open at the bottom, and fits over the bottom part which includes a carrier plate for the goods, positioned at an upper region of the bottom part, and preferably made of highly heat-conductive material, for example aluminum. A heat source, formed by either a plurality of circumferentially distributed burner elements, such as alcohol burners or the like, or by an essentially circular electrical heating unit, is located within the heating space in such a position that the carrier plate is heated as well as the baking space formed by the domed cover element beneath the dome itself, so that the baked goods will be heated from below, as well as heated from above, that is, from within the domed cover element. If an electrical heating unit is used, a single heater may be sufficient, located within the baking space and within the domed cover element. An additional heating unit, of lower power than the one in the domed element, may be located beneath the carrier plate for the goods to be baked.

The structure has the advantage that it ensures good distribution of the heat with respect to the dough, that is, the goods to be baked. A well-proportioned relationship between heat from the top as well as heat from the bottom is obtained. Use of unglazed stoneware, particularly a microporous fired-clay or terracotta top for the dome-shaped cover element permits acceptance or passage of vapors arising during the baking, so that moist condensates on the dough or goods to be baked will not result. A stoneware cover substantially increases the taste of the baked goods, since the cover reflects aromatic components within the dough.

DRAWINGS

DETAILED DESCRIPTION

Figure 1:
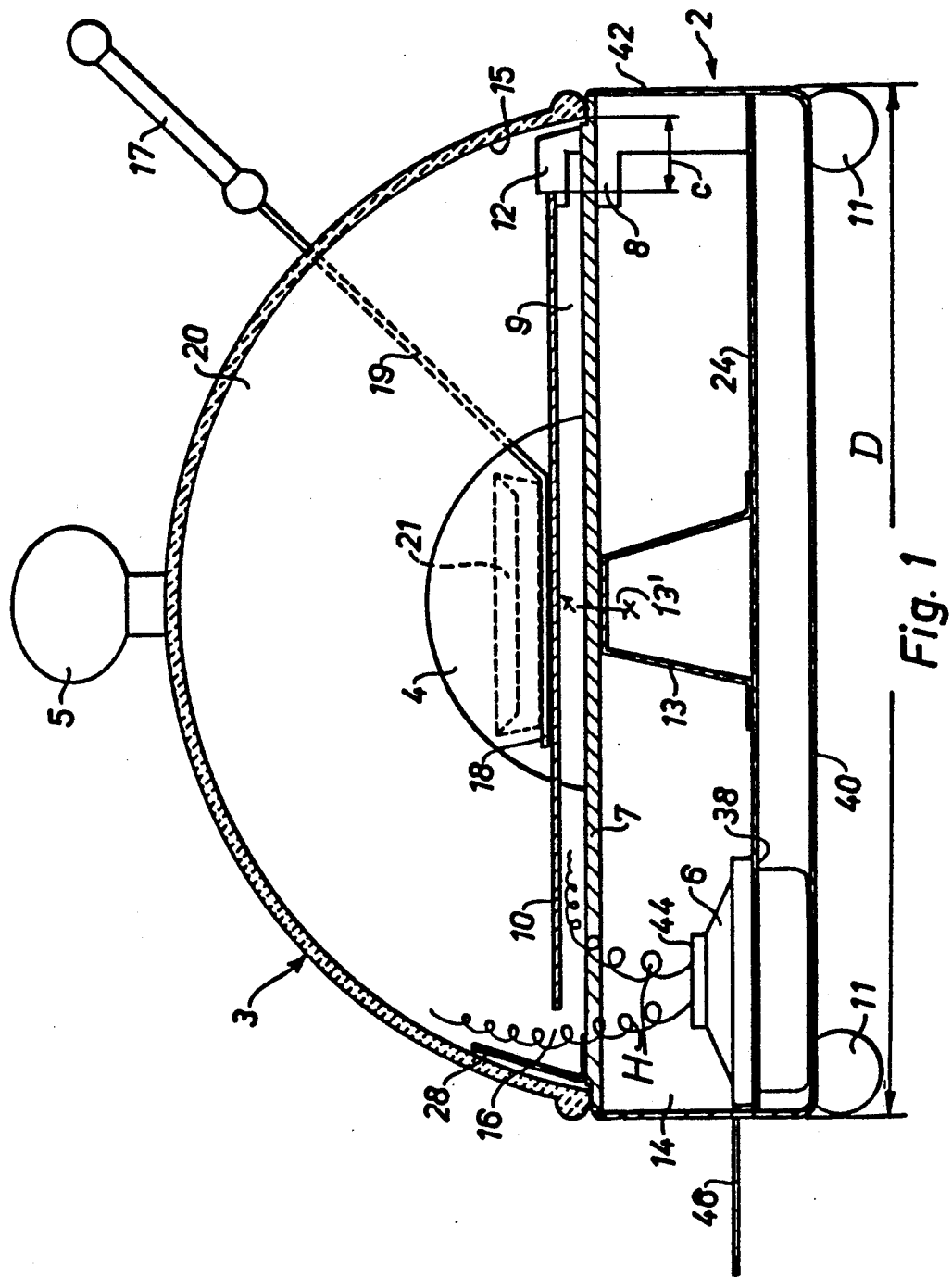
FIG. 1 is a highly schematic vertical cross-sectional view through the baking oven and illustrating one embodiment, namely with combustion heating elements.

Referring first to FIG. 1:

The oven, normally, is placed on a table, permitting several people at the same time to introduce pizza dough therein and to bake their own pizzas. The unit has a bottom portion 2, usually made of sheet steel, supplied with heat-insulating legs 11. It has an upper portion 3, formed as a removable cover unit, in shape of a dome.

Figure 8:
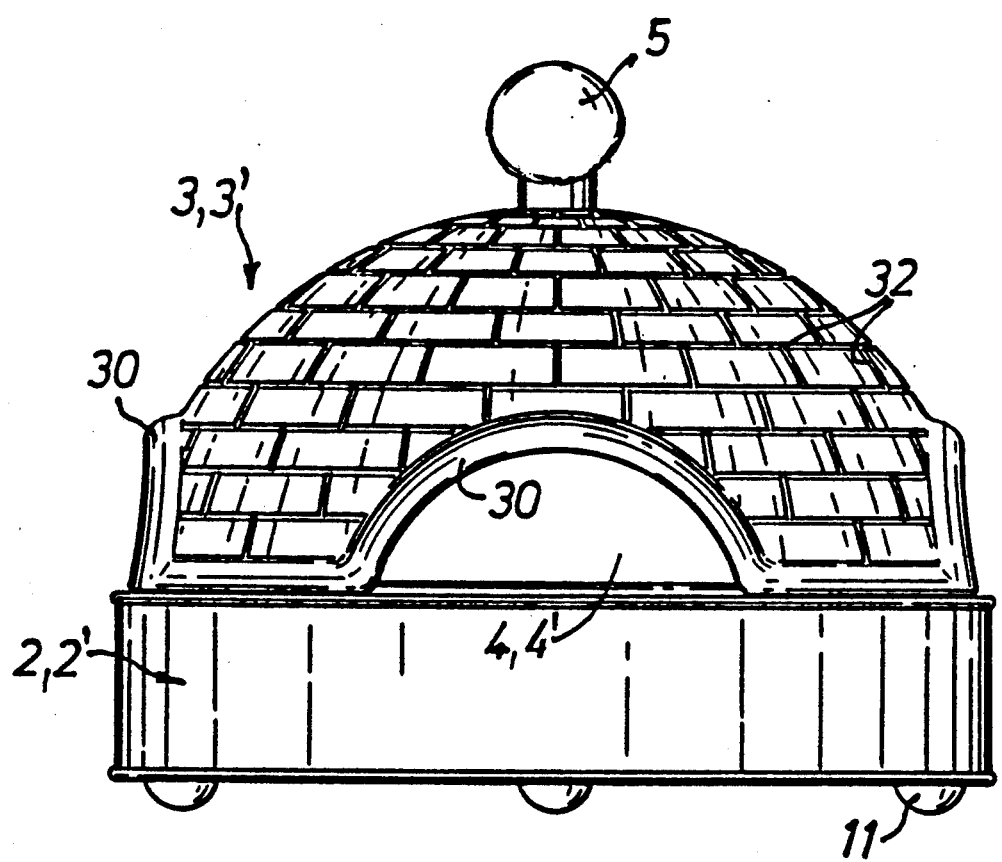
FIG. 8 is a pictorial illustration of the oven, without ladles for introduction of baked goods.

In accordance with a feature of the invention, the dome-shaped cover unit 3 is made of a ceramic material, preferably a sintered unglazed stoneware element, and more particularly fired, flame-resistant microporous clay or terracotta. The dome 3 is smooth at the inside; the outside can be decoratively shaped, for example in the form of a brick oven pattern, having grooves 32 (see FIG. 8). The dome cover 3, at its lower region, is formed with introduction or entrance openings 4. Preferably, three such openings 4 are provided, uniformly circumferentially distributed along the lower region of the dome 3. The openings as well as the lower rim of the dome 3 are reinforced, by a bead 30 (FIG. 8). A heat insulated handle, for example a knob 5, is secured to the top of the dome 3 so that it can be readily lifted off the lower portion 2.

In accordance with one feature of the invention, a plurality of burners 6 are located in the lower part 2. The burners may be burners which use a gaseous, liquid or pasty fuel, for example "Sterno" (TM). If three feeding or loading openings 4 are provided in the cover 3, it is desirable to provide three burner units in the bottom part 2. These burner units, also, are uniformly circumferentially distributed about the bottom part which, preferably, is circular. When placing the dome 3 over the part 2, it is desirable to locate the openings 4 offset from the burners, so that the burners are located between two openings 4. The burners 6 are held in position by being located on an intermediate plate 24 of the lower part 2.

Figure 4:
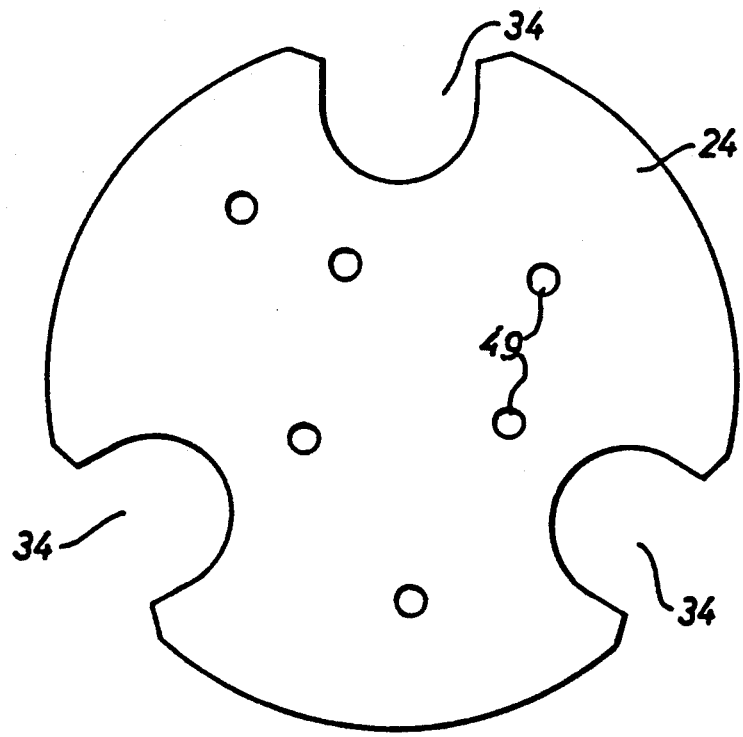
FIG. 4 is a top view of an intermediate plate for holding burner units.

The intermediate plate 24, as best seen in FIG. 4, is formed with recesses 34 to receive the housings for the burners. The depth of the recesses-defines the radial depth of introduction of the burners 6, and also locate the burners in position, so that they will have a predetermined position within the unit 2. The burners 6 are formed with shoulders 38 with which they can seat on the intermediate plate 24. They are spaced from a bottom plate 40 of the lower part 2 by a small distance.

Figure 3:
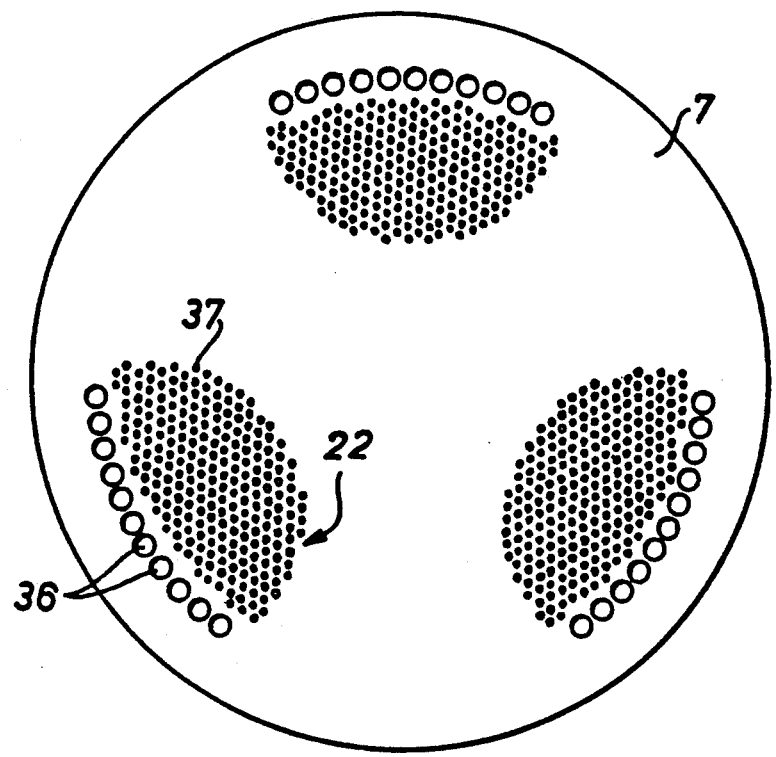
FIG. 3 is a top view of a heat distribution plate.

In accordance with a feature of the invention, a a disk-shaped heat distribution plate 7 (FIGS. 1 and 3) is located above the burners 6. The heat distribution plate also forms the top for the lower part 2. The heat distribution plate 7 is formed with openings 22 in the edge regions, which form segmental heat passage openings, as best seen in FIG. 3. The heat distribution plate is seated on the lower part 2 and centrally supported by a central support post 13 to provide reliable seating for the heat distribution plate. Post 13 is secured to the intermediate plate 24, for example by spot-welding. The heat distribution plate 7 preferably is removable, for example for cleaning, and can be readily centered on the support 13, for example by a pin-and-hole or an interengaging bump-and-recess connection as schematically shown at 13' in FIG. 1. The openings 22 may be holes 36, 37, slits or the like. Preferably, a radially outermost series of holes 36 is formed with larger openings than the more centrally located holes 37, as best seen in FIG. 3.

Figure 2:
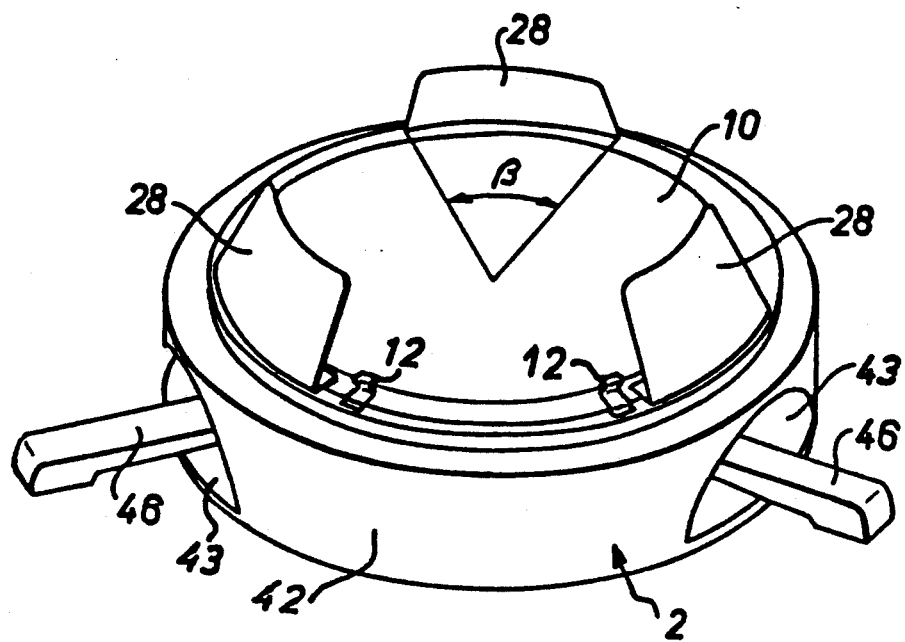
FIG. 2 is a perspective view of the apparatus of FIG. 1, with the dome cover removed.
Figure 5:
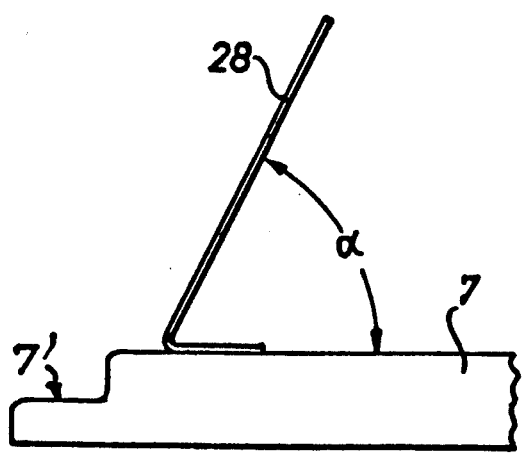
FIG. 5 is a fragmentary detail view of the carrier plate.

Three heat distribution shields 28 are secured to the heat distribution plate 7, as best seen in FIG. 5. These heat shields 28 are inclined with respect to a horizontal plane by an angle $\alpha$ of about 64°. The heat distribution shields 28 extend part-circumferentially over an angle $\beta$ (FIG. 2) which is somewhat less than 60°, preferably about 50°. The heat distribution plates 28 have a dual function, in that they direct proper positioning of the dome-shaped cover element 3 so that, upon wrong positioning of the cover element 3, the shields 28 block access to the interior of the dome-shaped cover 3 by blocking the introduction openings 4.

A carrier plate 10 to receive the dough 21, to be baked, as well as ladles 18 therefor, is located above the heat distribution plate 7 by a small vertical spacing, in the order of from about 1-2 cm. The carrier plate 10, preferably, is made of metal which is highly heat-conductive and heat-accepting, such as aluminum. The carrier plate 10 fits the overall shape of the lower portion of the dome-shaped cover 3; it is smaller than the heat distribution plate 7 and is supported by a plurality of circumferentially distributed support brackets 12 secured, for example by spot-welding, to the heat distribution plate 7. The smaller size of the carrier plate 12 will result in a ring-shaped gap 16 between the inner wall surface 15 of the dome-shaped cover 3 and the carrier plate 10. This ring-shaped gap has a width c of 4-5 cm (FIG. 1). The support brackets 12 can be secured to the carrier plate 10 or (:an be secured to an inwardly extending rim of the bottom part 2. In one embodiment, the heat distribution plate 7 is formed with a stepped outer ring region 7' (FIG. 5) to provide a locating ring for the hood 3. This stepped placing position, of course, could also be formed on the upper edge or rim of the lower part 2.

USE AND OPERATION

The burners 6 are introduced through openings 43 in the circumferential portion 42 of the lower part 2. Handles 48, of standard construction, are used to place the burners 6 on the intermediate plate 24, so positioned that the burner is beneath the openings 22 of the heat distribution plate 7. The burner openings 44 are positioned respectively vertically below the rim of the heat distribution plate 7 and partially in the region of the intermediate space 16. The hot gases, schematically shown at H in FIG. 1, thus will pass through the openings 22 of the heat distribution plate 7 and result in heating of the space 9 between the heat distribution plate 7 and the carrier plate 10, see FIG. 1. Thus, heat will affect the carrier plate 10, which has a relatively large surface and causes essentially uniform heating of the carrier plate 10, although only three heat sources, of essentially concentrated size, are provided. In addition, a portion of the heat from the burner 6 escapes through the gap 16 and passes into the interior space 20 within the dome-shaped top 3 along the inner surface 15 thereof. Thus, an optimum distribution between heat from above and heat from below is obtained, resulting in uniform baking of dough 21 placed[on ladles 18, coupled to ladle shafts 19 and terminating in handles 17 which, preferably, are heat-insulating. Air holes are formed in the bottom 40 of the lower part 2 as well as in the intermediate plate 24, as seen at 49 in FIG. 4.

The dough 21, for example a previously prepared relatively small pizza, is placed on a ladle or spatula 18 which, preferably, is apertured. The spatula is coupled to a stem 19 which terminates in a heat insulating and heat-resistant handle 17. The spatula or ladle 18 is introduced through the feed or supply openings 4 into the interior of the dome-shaped cover 3. The dough remains on the spatula or ladle 18 during baking.

When the baked goods are ready and done, the ladle or spatula is removed from the opening 4. Preferably, the opening 4 is so dimensioned that two spatulas 18 can be placed, simultaneously, next to each other.

In accordance with a preferred feature of the invention, the dome 3 has three introduction openings 4 and three burners 6.

Figure 6:
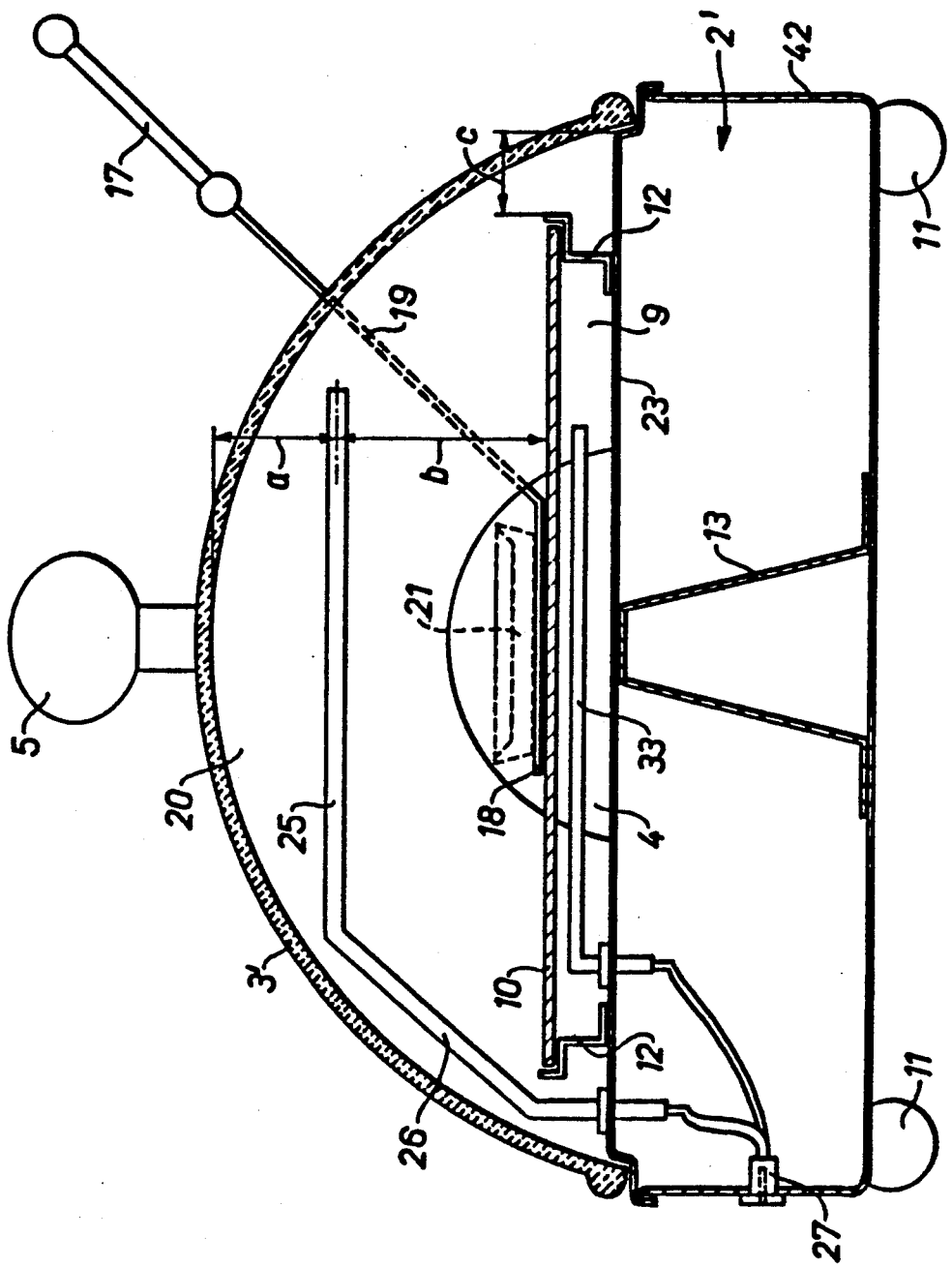
FIG. 6 is a schematic vertical cross-sectional view, similar to FIG. 1, of an oven with electrical heating.
Figure 7:
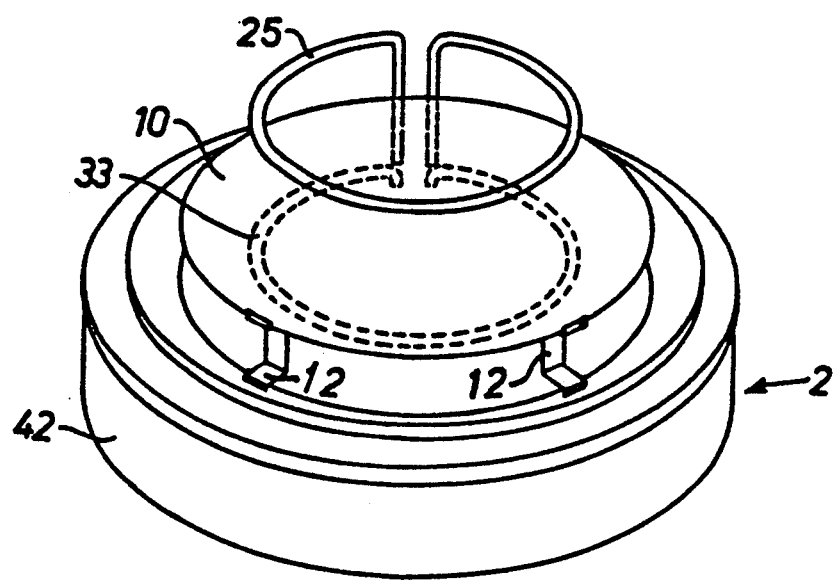
FIG. 7 is a perspective view of the oven of FIG. 6, with the cover unit removed.

The pizza can also be baked by using an oven which is electrically heated. Referring to FIGS. 6 and 7, in which similar reference numerals indicate elements of similar functions.

Rather than using fuel-fed burners, an electric heater 25 is located above the carrier plate 10. The electric heating element 25 is ring-shaped, and has a diameter which is less than the diameter of the carrier plate 10. The lower part 2' is formed with a cover plate 23. The heating element 25 is attached to the cover plate 23, and the electrical connections lead to an electrical terminal 27 at the surrounding portion 42 of the lower part 2'. The ring-shaped heating element 25 is, in accordance with a feature of the invention, located between about one-half to two-thirds of the space between the carrier plate 10 and the zenith of the dome-shaped cover 3. Preferably, the distance a between the heating element 25 and the zenith of the cover 3 is about 4.5 cm; the spacing of the heating element from the carrier plate 10, shown at b in FIG. 6, is about 7 cm. The diameter of the ring-shaped electrical heating element 28 can then be about 20 cm. The dome-shaped cover 3' in the electrically heated embodiment is preferably formed with four circumferentially distributed openings 4'. Even if four pizzas 21 are located in the interior of the dome-shaped cover 3', the pizzas will not cover the entire surface of the carrier plate 10. The carrier plate 10, being made of good heat-conductive material, for example aluminum, provides for radiation of heat by the carrier plate due to heat accepted and received from the heater element 25 from above, and supplies heat from the bottom to the dough to be baked, so that the baked goods will be heated from the top as well as from the bottom; the dough thus is exposed to the heat within the interior of the cover 3', derived directly from the heating element 25, and acting as top heat, plate 10 provides bottom heat.

To accelerate the baking, a second heating element 33 may be placed beneath the carrier plate 10 in the space 9 above the cover plate 23 of the lower part 2'. The second heating element 33 also is of ring shape, but of a diameter which is smaller than that of the first heater element 25. The power rating of the second or auxiliary heater 33 is smaller than that of the upper heater element 25. If two heater elements are used, a typical power rating for the heater element 25 is about 500 W, and the second heater element 33 is about 300 W, resulting in an overall power consumption of 800 W to bake four pizzas.

The structure is preferably circular, and a suitable dimension D (FIG. 1) is about 40 cm.

Various changes and modifications may be made within the scope of the inventive concept; for example, it is not necessary that the oven be circular; other shapes may be used, for example oval, hexagonal or the like.

I claim:

1. Table-top baking oven having
    a bottom part (2, 2'); and
    a top part in the shape of a removable cover (3, 3'), said removable cover defining a lower and an upper region when the removable cover is placed on the bottom part, said removable cover further defining a heating space therebeneath,
    wherein, in accordance with the invention,
    the removable cover (3) comprises an essentially dome-shaped cover element of unglazed heat-resistant stoneware, defining a baking space underneath the cover, said cover being formed with at least two dough insertion openings (4, 4') uniformly positioned along the lower circumference of the cover, and open at the bottom, said cover fitting over the bottom part;
    a carrier plate (10) for the goods is provided, positioned at an upper region of the bottom part (2, 2'); and
    a heat source (6, 25) is provided, located within the heating space to heat the carrier plate (10) as well as the baking space (20) beneath the dome-shaped cover.

2. The oven of claim 1, wherein the lower part (2) further includes
    a heat distribution plate (7) formed with apertures (22, 36, 37) therethrough, the carrier plate (10) being located above the heat distribution plate and spaced therefrom,
    whereby a heat flow space (9) will be formed between the heat distribution plate (7) and the carrier plate,
    said heat distribution plate (7) being larger in the direction of the major plane of said plate than the carrier plate (10) to define a ring-shaped lateral gap (16), said gap being further delimited at its outer region by said dome-shaped cover (3, 3') when the cover is in position on the bottom part (2, 2');
    and wherein said heat source (6) comprises burner elements (6) located beneath the heat distribution plate (7) at lateral or edge regions thereof, and circumferentially positioned between the introduction openings (4) in the dome-shaped cover (3, 3') when the cover is in position for baking on the bottom part.

3. The oven of claim 2, further including an intermediate support plate (24) extending transversely within the bottom part, said support plate being formed with recesses or cut-outs (34) dimensioned and shaped to receive the burners (6), said recesses or cut-outs being located with respect to the carrier plate (10) and the gap (16) between the carrier plate (10) and the inner surface (20) of the dome-shaped cover (3) to position a burner opening of the burner in partial alignment with said carrier plate (10) and said gap.

4. The oven of claim 2, further including heat directing and projecting shields (28) located above the heat distribution plate and extending upwardly into said baking space (20), adjacent the inner wall (15) of the dome-shaped cover (3) when the dome-shaped cover is located on the bottom part (2).

5. The oven of claim 2, wherein the dome-shaped cover (3) is formed with three dough introduction or insertion openings (4), and
    wherein three burners are located in the bottom part, circumferentially offset, uniformly, with respect to said openings (4).

6. The oven of claim 1, wherein said dome-shaped part (3, 3') has at least approximately circular outline; and
    wherein the carrier plate (10) id essentially circular.

7. The oven of claim 1, wherein the carrier plate (10) comprises a highly heat-conductive material.

8. The oven of claim 1, wherein the carrier plate (10) comprises aluminum.

9. The oven of claim 1, wherein the dome-shaped cover (3) is formed with at least three openings (4, 4'), uniformly, circumferentially distributed about the dome-shaped cover, and open to the bottom thereof.

10. The oven of claim 1, wherein the heat source comprises an electrical heating element (25), secured and mechanically supported by the bottom part (2'), and positioned within the heating space inside of the dome-shaped cover, and spaced vertically above the carrier plate (10).

11. The oven of claim 10, wherein the bottom part (2') is formed with a top cover plate (23) located below the carrier plate (10) and spaced therefrom by a heat exchange gap (9); and
    wherein a further electrical heating element (33) is provided positioned in said heat exchange gap (9).

12. The oven of claim 11, wherein said electrical heating element (25) and said further electrical heating element (33) are ring-shaped.

13. The oven of claim 10, wherein the distance (b) of the heating element (25) from the carrier plate (10) is greater than the distance (a) of the heating element (25) to the zenith of the dome-shaped cover (3').

14. The oven of claim 11, wherein the distance (b) of the heating element (25) from the carrier plate (10) is greater than the distance (a) of the heating element (25) to the zenith of the dome-shaped cover (3').

15. A table-top home-baking set comprising
    the oven as claimed in claim 1
    in combination with
    a spatula or ladle (18) for placing dough to be baked in the oven on said carrier plate, said spatula or ladle further including a stem (19) and a handle (17) coupled to the stem.

16. The set of claim 15, wherein said carrier plate (10) is dimensioned and sized to receive a plurality of ladles or spatulas (18) thereon for simultaneously baking a plurality of baked goods.

* * * * *